Sept. 29, 1936.  F. W. MANNING  2,055,873
BEVERAGE FILTER
Filed Sept. 18, 1934   2 Sheets-Sheet 1

INVENTOR
Fred W. Manning

Sept. 29, 1936.   F. W. MANNING   2,055,873
BEVERAGE FILTER
Filed Sept. 18, 1934   2 Sheets-Sheet 2

INVENTOR
Fred W Manning

Patented Sept. 29, 1936

2,055,873

UNITED STATES PATENT OFFICE 2,055,873

BEVERAGE FILTER

Fred W. Manning, Altadena, Calif., assignor to F. W. Manning Company, Ltd., Los Angeles, Calif., a corporation of California Application September 18, 1934, Serial No. 744,523

15 Claims. (Cl. 210—94)

This invention relates to improvements in the treatment of fluids and solids by filtration, and particularly to the removal of filterable impurities from fruit and vegetable juices and other beverages, such as wine and beer, etc. This application is a continuation-in-part of an application entitled "Juice extraction filter", Serial No. 643,583, filed by me on November 21, 1932.

It has been the practice heretofore to accomplish the separation of solids from beverages by means of one thickness or layer of fabric, and if the solids happened to be of a slimy, mucilaginous, or colloidal character, or otherwise difficult to remove, the one thickness was first given a thin coating in a pre-filtering operation of some treating agent such as kieselguhr, or other porous substance, so that by means of the collection of impurities on, or through the depth of, the one thin coating, clarity and a better rate of filtrate flow could be obtained. Such methods fail to sterilize the filtered beverage and result in constantly decreasing filtering rates and increasing filtering pressures when pump pressure is used, until finally there must be an interruption in the filtering operation for the purpose of cleaning or replacing the filter fabric.

As distinguished from such prior methods, the present invention includes the advantage of rendering a beverage absolutely sterile by passing it through a replaceable filter bed comprising a plurality of contiguous layers of filter fabric, the surface layers of which may be removed as they become contaminated, so as to maintain a substantially constant filtering rate.

In accordance with my invention a suitable paper for filtration purposes, made from cellulose, asbestos, or other fibres of vegetable, animal, or mineral origin, or a mixture of them, is wound into an annular spiral roll to form a filter bed, the layers being wound alternately with a reinforcing agent upon a supporting foraminous paper or plate; and into this annular roll is inserted and expanded a drainage member to carry away the filtrate. The whole structure may then be inserted in a closed tank and pump pressure used to force the fluid through the filter roll, the filtrate outlet of the drainage member being carried through the wall of the closed tank; or the filter may be placed in an open tank and suction applied to the filtrate outlet of the drainage member to create the necessary differential pressure required for filtration.

The reinforcing agent may consist of fibres or threads of any suitable material of greater length and tensile strength than those in the paper, and they may be tied together by weft threads, thereby making an open mesh fabric. In any event, the threads must not be so close that they impede the passage of the fluid to be filtered, and they must be of sufficient strength to carry a contaminated portion of paper as the latter is being removed from the filter roll. The passage of a fluid through the filter bed will cause the fibres to become embedded in the underlying threads or open mesh fabric without it being necessary to coat either the paper or reinforcing agent with sizing or an adhesive. Or, if desirable, a filter roll made from filter fabric, the manufacture of which is described in my Patents Nos. 1,782,784, 1,782,785, and 1,786,669, may be substituted for a roll made from alternate windings of paper and threads or scrim.

A beverage may be absolutely sterilized by its passage through a filter bed made of suitable fibres, as described above; and, if care is taken, bottled to retain its original flavor and aroma for years. If fermentation is required, either a little of the enzyme "zymase" or some dry active yeast in a sugar tablet, added to the beverage as it is bottled, will produce the necesary carbon dioxide and give the beverage the desired effervescence when the bottle is finally opened for use.

The invention is exemplified in the following description, and one form of apparatus is illustrated by way of example in the accompanying drawings, in which.

Figure 1:
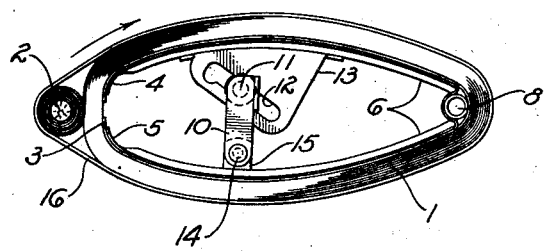
Fig. 1 is a plan view of the filter showing the drainage member partly expanded.
Figure 2:
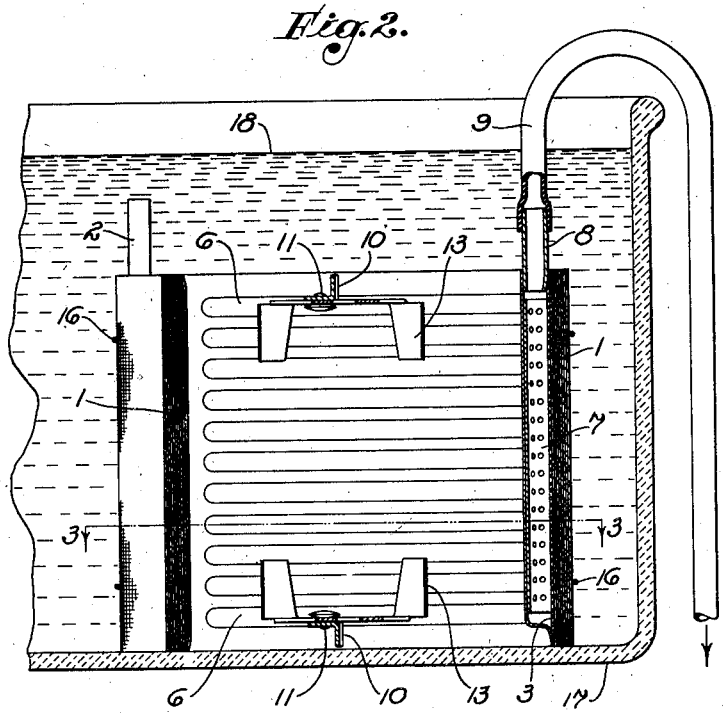
Fig. 2 is a vertical section of the filter with the drainage member partly expanded.
Figure 3:
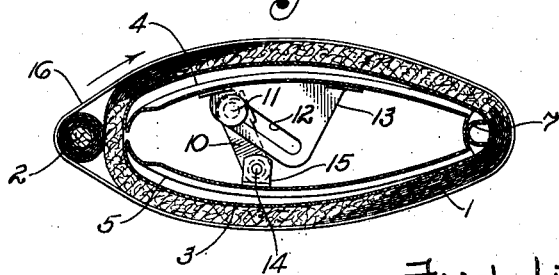
Fig. 3 is a cross-section of the filter on line 3—3 of Fig. 2, showing the drainage member after insertion in the filter roll before expanding.

Figs. 1 to 3 show a fabric recharge consisting of an annular filter roll 1, the removal roll 2, and a foraminous waxed paper supporting wall 3. Within the recharge is the drainage member consisting of the two expanding wings 4 and 5, in which are crimped the longitudinal drainage channels 6; and at the juncture of the two wings is the vertical perforated drainage channel 7 and the filtrate outlet 8, a tube 9 being attached to the latter for siphoning purposes. The width of the paper supporting wall is less than the height of the drainage member so that the flared edges of the latter will make a suitable joint with the edges of the fabric windings. The drainage wings are expanded by using the toggle levers 10 to force forward the pins 11 in the guide slots 12 of the brackets 13, the pins being rigidly attached to the floating ends of the toggle levers, and the inner ends of the latter being positioned by pins 14 to the fulcrum brackets 15. The top and bottom expanding mechanisms are in duplicate, the slotted brackets being attached to either one of the drainage wings and not necessarily to the same wing, and the fulcrum brackets to the opposite drainage wing, or wings. Rubber bands 16 are used to keep the removal roll in pressural engagement with the filter roll. The filter is shown submerged and sitting on the bottom of a vessel 17 containing a liquid 18 to be filtered.

Figure 4:
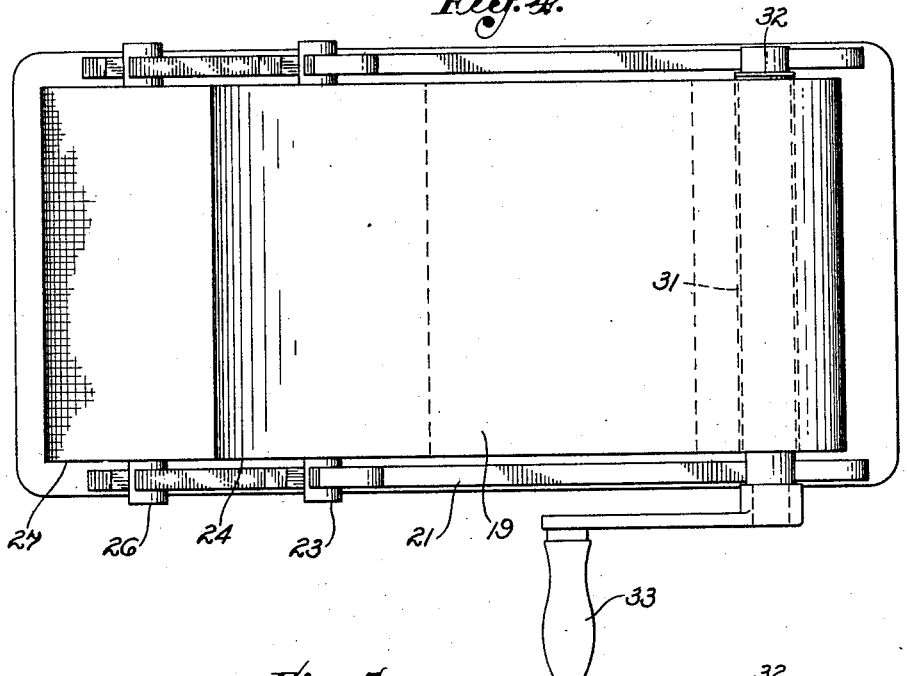
Fig. 4 is a plan view of the annular filter roll winding apparatus.
Figure 5:
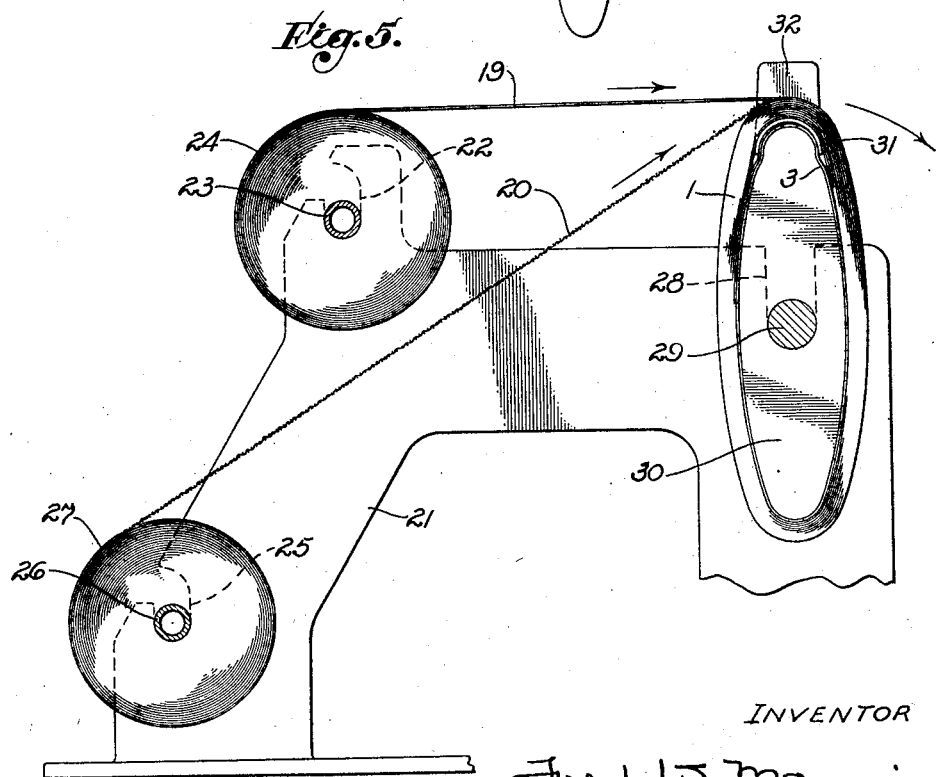
Fig. 5 is a part elevation of the annular filter roll winding apparatus with one of the supporting frames removed.

Figs. 4 and 5 show a device for winding the filter paper 19 in alternate layers with a reinforcing scrim 20 into an annular filter roll. This winding device consists of a supporting frame 21 having slots 22 to take the tube 23 on which the paper roll 24 is wound, slots 25 to take the tube 26 on which the scrim roll 27 is wound, and slots 28 to take the axis 29 of the winding arbor 30 on which the annular roll is made up. Semi-circular clamp 31, having a turned up end 32 for withdrawal purposes, is used to clamp the ends of the filter paper, scrim, and perforated waxed supporting paper to the arbor at the beginning of the winding operation; and crank 33 is used for turning the arbor.

The operation of the apparatus thus constructed has been in part indicated in connection with the foregoing description. In making up an annular roll, a heavy perforated waxed paper 3 is first passed around the winding arbor 30 of approximately the same shape that the filter roll takes when in operation; and the ends of the waxed paper, together with the ends of the filter paper and scrim, are then fastened to the arbor by means of the clamp 31. After a sufficient number of turns of the arbor have been made to give the required depth of windings, the filter paper and scrim are cut and their outer ends of the annular roll attached to the removal roll 2. A couple of elastic bands may be slipped over the annular and removal rolls to prevent unrolling of the fabric during inoperation of the filter and to tension the rolls together during operation of the filter. The ends of the windings may also be coated with some adhesive, such as shellac, rubber cement, etc., to bind the windings together and also prevent their unrolling. A little paper packing may be inserted in the center of the filter roll and the latter then flattened for packing and shipping purposes. The heavy perforated paper supports the windings and prevents the fabric from being depressed into the longitudinal drainage channels 6, and the vertical drainage channel 7, by the filtering differential pressure; and the waxed sides of the heavy perforated paper help to form the end joints between the windings and the wings of the drainage member. If either the filtering pressure, or the liquid to be filtered, is such that a waxed paper supporting wall cannot be used, a foraminous metal plate may be substituted; and if made somewhat narrower than the height of the drainage member, the fabric windings may be used, as in the present case, to make their own joint against the flared edges of the drainage member. Winding of the filter fabric into approximately the same form as that ultimately taken by the annular windings when in operation prevents creepage of one layer upon another, which would be the case if the shape were much changed at the time the drainage member was expanded within the filter roll; and creepage of the layers detracts from a uniform tension of the windings and results in a lessening of the efficiency of the filter. After insertion and expanding of the drainage member within the filter roll, the latter may be dropped into the liquid to be filtered, and the fabric, as it becomes contaminated, removed from the annular roll into the removal roll by the rotation of the latter on its own axis and around the filter roll. After complete exhaustion of a filter roll, the wings of the drainage member may be retracted, the windings discarded, and the drainage member inserted within a fresh filter roll.

It will thus be evident from the foregoing description that although the wings of an oval drainage member may be somewhat more easily tensioned against the sides of an oval filter roll, yet the sides of an interrupted circular drainage member may likewise be expanded within a circular filter roll by means of a cam or toggle or other similar arrangement; or, in other words, the fabric may be wound on a perforated metal or cardboard collapsible or non-collapsible tube of the same length as, or shorter than, the fabric roll, and the tube and windings then dropped over an interrupted circular drainage member and the latter expanded to support and make end joints with the former.

It will furthermore be evident that filtration may be accomplished in the reverse direction by surrounding the annular filter roll with an interrupted annular drainage member, the sides of which may also be closed by a cam or toggle or other similar movement, and placing the removal roll on the inside of the filter roll with which it can be held in rolling contact by the cemented edges of the filter fabric.

It will therefore be understood through the specification and appended claims that the term "annular roll" means a roll of any shape, which may be enclosed within a drainage member, and through which a fluid may be passed from the inside; or in which a drainage member may be inserted and expanded, and through which a fluid may be passed from the outside; and that any combination of paper and reinforcing threads, with or without sizing or adhesive, is considered a "filter fabric".

I claim as my invention:

1. A filtrate drainage plate for an annular filter wall, comprising: an interrupted annular member having interrupted drainage channels therein; a common outlet communicating with the said channels for conducting the filtrate from the said member; and means for closing and opening the sides of the annular member whereby the said member may be adjusted closely to the filtrate side of the filter wall to prevent entrance into the interrupted drainage channels of unfiltered fluid.

2. A filtrate drainage plate for an annular filter wall, comprising: an interrupted annular member having interrupted drainage channels therein; a common outlet communicating with the said channels for conducting the filtrate from the said member; an interrupted annular foraminous retaining wall adjacent to the said annular member to aid the said member in supporting the filter wall; and means for closing and opening the sides of the annular member whereby the said member and retaining wall may be adjusted closely to the filtrate side of the filter wall to prevent entrance into the interrupted drainage channels of unfiltered fluid.

3. In a filter, the combination of: a filter wall comprising an annular roll of contiguous layers of filter fabric; a foraminous retaining wall of less width than the said filter wall and upon which the layers of filter fabric are wound; an interrupted annular filtrate drainage member of the same width as the filter wall, the said member having flared ends extending beyond the width of the retaining wall; and means for closing and opening the sides of the drainage member whereby the said member may be inserted within the retaining wall and the flared ends extended against the filter wall.

4. A filtrate drainage plate for an annular filter wall, comprising: an interrupted annular member having drainage channels therein; means for closing and opening the sides of the annular member whereby the said member may be adjusted closely to the filtrate side of the filter wall; and means forming a passage closed from the unfiltered fluid and connected with said channels for conducting the filtrate from said member.

5. In a filter, the combination of: a filter wall comprising an annular roll of contiguous layers of filter fabric; a filtrate drainage member for insertion within the annular roll, said drainage member having passages therein to receive filtrate from said filter wall; means for expanding the drainage member within the annular roll to prevent passage into the said member of unfiltered fluid; and walls forming a passage closed from the unfiltered fluid and connected with said passages to conduct the filtrate from said drainage member.

6. In a filter, the combination of: a filter wall comprising an annular roll of contiguous layers of filter fabric; a removal roll attached to one end of the filter fabric and in frictional contact with the annular roll; a filtrate drainage member for insertion within the annular roll, the said drainage member having passages therein with a common outlet to receive filtrate from the filter wall; means for expanding the drainage member within the annular roll to prevent entrance into the said member of unfiltered fluid; and means for rotating the removal roll whereby a portion of the filter fabric is removed from the annular roll and wound upon the removal roll.

7. In a filter, the combination of: a filter wall comprising an annular roll of contiguous layers of filter fabric, each of the said layers of filter fabric including a layer of filter solids enclosing a layer of reinforcing threads; a removal roll attached to one end of the filter fabric and in frictional contact with the annular roll; and means for rotating the removal roll to remove a portion of the filter fabric from the annular roll onto the removal roll whereby the said portion of filter fabric is reversed so as to enclose the removed filter solids within the removed reinforcing threads.

8. In a filter, the combination of: a filter wall comprising an annular roll of contiguous layers of filter fabric, each of the said layers of filter fabric including a layer of filter solids enclosing a layer of reinforcing threads; means for passing a fluid through the said filter wall whereby the said solids are retained upon the said reinforcing threads; a removal roll attached to one end of the filter fabric and in frictional contact with the annular roll; and means for rotating the removal roll to remove a portion of the filter fabric from the annular roll onto the removal roll whereby the removed solids are enclosed within their reinforcing threads immediately the said solids cease to be retained on the said threads by the passage therethrough of the said fluid.

9. In a filter, the combination of: a filter wall comprising an annular roll of contiguous layers of filter fabric; a removal roll attached to one end of the filter fabric and in frictional contact with the annular roll; an outlet communicating with the filter wall, and the filter wall and removal roll adapted for submergence in a fluid, whereby the said fluid may be passed through the filter wall; and means for rotating the removal roll around the annular roll whereby a portion of filter fabric is removed from the annular roll and wound upon the removal roll.

10. In a filter, the combination of: a filter wall comprising an annular roll of contiguous layers of filter fabric; a removal roll attached to one end of the filter fabric; means for maintaining the annular roll and removal roll in frictional contact with each other; an outlet communicating with the filter wall, and the filter wall and removal roll adapted for submergence in a fluid, whereby the said fluid may be passed through the filter wall; and means for rotating the removal roll around the annular roll whereby a portion of filter fabric is removed from the annular roll and wound upon the removal roll.

11. In a filter, the combination of: an annular filter wall; a filtrate drainage member for insertion within the annular wall, the said drainage member having passages therein; an outlet communicating with the said passages, and the filter wall adapted for submergence in a fluid, whereby the said fluid may be passed through the filter wall; and means for expanding the drainage member within the annular roll to prevent entrance into the said member of unfiltered fluid.

12. In a filter, the combination of: a filter wall comprising an annular roll of contiguous layers of filter fabric; a filtrate drainage member for insertion within the annular roll, the said drainage member having passages therein; an outlet communicating with the said passages, and the filter wall adapted for submergence in a fluid, whereby the said fluid may be passed through the filter wall; and means for expanding the drainage member within the annular roll to prevent passage into the said member of unfiltered fluid.

13. In a filter, the combination of: a filter wall comprising an annular roll of contiguous layers of filter fabric; a removal roll attached to one end of the filter fabric and in frictional contact with the annular roll; a filtrate drainage member for insertion within the annular roll, the said drainage member having passages therein; an outlet communicating with the said passages, and the filter wall and removal roll adapted for submergence in a fluid, whereby the said fluid may be passed through the filter wall; means for expanding the drainage member within the annular roll to prevent entrance into the said member of unfiltered fluid; and means for rotating the removal roll whereby a portion of filter fabric is removed from the annular roll and wound upon the removal roll.

14. In a filter, the combination of: a filter wall comprising an annular roll of contiguous layers of filter fabric; a foraminous retaining wall to support the filter wall and upon which the layers of filter fabric are wound; a filtrate drainage member for insertion within the retaining wall; an outlet communicating with the drainage member, and the filter wall and removal roll adapted for submergence in a fluid, whereby the said fluid may be passed through the filter wall; and means for expanding the drainage member within the retaining wall to prevent passage into the said member of unfiltered fluid.

15. In a filter, the combination of: a filter wall comprising an annular roll of contiguous layers of filter fabric; a foraminous retaining wall to support the filter wall and upon which the layers of filter fabric are wound; a removal roll attached to one end of the filter fabric and in frictional contact with the annular roll; a filtrate drainage member, for insertion within the retaining wall; an outlet communicating with the drainage member, and the filter wall, retaining wall, and removal roll, adapted for submergence in a fluid, whereby the said fluid may be passed through the filter wall; means for expanding the drainage member within the retaining wall to prevent entrance into the said member of unfiltered fluid; and means for rotating the removal roll whereby a portion of filter fabric is removed from the annular roll and wound upon the removal roll.

FRED W. MANNING.